US011495888B2

(12) United States Patent
Lim (10) Patent No.: US 11,495,888 B2
(45) Date of Patent: Nov. 8, 2022

(54) LEAKY WAVE ANTENNA FOR FORMING DUAL-BEAM AND AN ELECTRONIC DEVICE INCLUDING THE LEAKY WAVE ANTENNA

(71) Applicant: CHUNG ANG UNIVERSITY INDUSTRY ACADEMIC COOPERATION FOUNDATION, Seoul (KR)

(72) Inventor: Sungjoon Lim, Anyang-si (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 249 days.

(21) Appl. No.: 17/007,097

(22) Filed: Aug. 31, 2020

(65) Prior Publication Data

US 2021/0305711 A1 Sep. 30, 2021

(30) Foreign Application Priority Data

Mar. 24, 2020 (KR) .................. 10-2020-0035911

(51) Int. Cl.
*H01Q 13/20* (2006.01)
*H04B 3/52* (2006.01)
*H04B 3/54* (2006.01)

(52) U.S. Cl.
CPC .......... *H01Q 13/20* (2013.01); *H01Q 13/203* (2013.01); *H01Q 13/206* (2013.01); *H04B 3/52* (2013.01); *H04B 3/54* (2013.01)

(58) Field of Classification Search
CPC .... H01Q 21/0075; H01Q 1/14; H01Q 21/065; H01Q 13/20; H01Q 13/206;
(Continued)

(56) References Cited

U.S. PATENT DOCUMENTS 8,368,599 B2 * 2/2013 Lim ..................... H01Q 19/005
343/749
8,803,748 B2 * 8/2014 Lim ..................... H01Q 1/3275
343/711
(Continued)

FOREIGN PATENT DOCUMENTS

KR 10-2019-0001741 A 1/2019
KR 10-2019-0090292 A 8/2019

OTHER PUBLICATIONS

Dual-Beam Steering Microstrip Leaky Wave Antenna With Fixed Operating Frequency. Yuanxin Li, Quan Xue, Edward Kai-Ning Yung, and Yunliang Long. (Year: 2008).*
(Continued)

*Primary Examiner* — Vibol Tan
(74) *Attorney, Agent, or Firm* — Bridgeway IP Law Group, PLLC; Sang Ho Lee; Hyun Woo Shin (57) ABSTRACT

Provided is a leaky wave antenna comprising a power supply line receiving power from the outside and a metal plate receiving a signal for forming a beam from the power supply line, in which etching patterns for forming a dual-beam are symmetrically formed on one side of the metal plate and the other side of the metal plate facing the one side and a plurality of vias are disposed between the one side and the other side.

12 Claims, 5 Drawing Sheets

(58) Field of Classification Search
CPC .... H01Q 13/203; H01Q 13/28; H01Q 25/002; H01Q 13/24; H01Q 1/46; H01Q 3/26; H04B 3/52; H04B 3/54
See application file for complete search history.

(56) References Cited

U.S. PATENT DOCUMENTS

| | | | |
|---|---|---|---|
| 9,614,291 B2 * | 4/2017 | Hu | H01Q 21/065 |
| 9,853,361 B2 * | 12/2017 | Chen | H01Q 9/0442 |
| 10,522,900 B2 * | 12/2019 | Khripkov | H01Q 1/243 |
| 2022/0102873 A1 * | 3/2022 | Wang | H01Q 9/0457 |

OTHER PUBLICATIONS

Leaky-Wave Antennas. By David R. Jackson, Fellow IEEE, Christophe Caloz, Fellow IEEE, and Tatsuo Itoh, Life Fellow IEEE (Year: 2012).*

One-Dimensional Triple Periodic Dual-Beam Microstrip Leaky-Wave Antenna. Zi Long Ma and Li Jun Jiang, Senior Member, IEEE (Year: 2015).*

Sungjoon Lim et al., "V-band Leaky-Wave Antenna With Wide Beam Steering Capability", Korean Institute of Electromagnetic Engineering and Science, vol. 7, No. 1, Republic of Korea (Aug. 22-24, 2019).

* cited by examiner

LEAKY WAVE ANTENNA FOR FORMING DUAL-BEAM AND AN ELECTRONIC DEVICE INCLUDING THE LEAKY WAVE ANTENNA

CROSS-REFERENCE TO RELATED APPLICATIONS

This application claims priority to Korean Patent Application No. 10-2020-0035911 filed on Mar. 24, 2020, in the Korean Intellectual Property Office, the disclosure of which is incorporated herein by reference.

STATEMENT REGARDING PRIOR DISCLOSURES BY THE INVENTOR

Applicant hereby states that a prior disclosure made directly or indirectly by the inventor, which is identified as a non-patent literature in an accompanying information disclosure statement, does not qualify as prior art under the grace period exception of 35 USC § 102(b)(1).

BACKGROUND

Field

The present disclosure relates to a leaky wave antenna for forming a dual-beam and an electronic device including the leaky wave antenna.

Description of the Related Art

Efforts have been made to develop an advanced 5G communication system or a pre-5G communication system to meet the demand for wireless data traffic increasing after commercialization of a 4G communication system. For this reason, the 5G communication system or the pre-5G communication system is called a beyond 4G network communication system or a post LTE system. To achieve high data rate, the 5G communication system has been considered for implementation in an ultra-high frequency (mmWave) band (e.g., 60 GHz band). In order to mitigate a path loss of radio waves in the ultra-high frequency band and increase a transmission distance of radio waves, in the 5G communication system, beamforming, massive MIMO, and full dimensional MIMO (FD-MIMO), array antenna, analog beam-forming, and large scale antenna technologies have been discussed. Further, in order to improve the network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, in the 5G system, an advanced coding modulation (ACM) scheme such as hybrid FSK and QAM modulation (FQAM) and sliding window superposition coding (SWSC), and advanced access techniques such as filter band multi carrier (FBMC), non-orthogonal multiple access (NOMA), and sparse code multiple access (SCMA) have been developed.

Meanwhile, the Internet is advanced from a human-centered connection network where humans create and consume information, to an Internet of Things (IoT) network that exchanges and processes information between distributed components such as objects. Internet of Everything (IoE) technology, in which big data processing technology, etc., connected to cloud servers, etc. are combined with IoT technology is also emerging. In order to implement the IoT, technical elements such as sensing technology, wired/wireless communication and network infrastructure, service interface technology, and security technology are required. Recently, a sensor network for connection between objects, machine to machine (M2M), machine type communication (MTC), etc. have been studied. In the IoT environment, an intelligent Internet technology (IT) service that collects and analyzes data created from connected objects to create new values in human life may be provided. The IoT may be applied to fields such as smart home, smart building, smart city, smart car or connected car, smart grid, health care, smart home appliance, high-tech medical service through convergence and complex between existing information technology (IT) and various industries.

Accordingly, various attempts have been made to apply the 5G communication system to an IoT network. For example, technologies such as sensor network, machine to machine (M2M), and machine type communication (MTC) have been implemented by techniques such as beamforming, MIMO, array antenna, etc., which are 5G communication technologies. The application of cloud radio access network (cloud RAN) as the big data processing technology described above will be an example of the convergence of the 5G technology and the IoT technology.

SUMMARY

As described above, in a next-generation communication system, it is required to secure a wide beam width through beamforming. However, when a beam band is extended to secure a wide beam width, the maximum gain of the beam may be lowered. Accordingly, a method of extending the beam width while maintaining the maximum gain of the beam has been studied, and the present disclosure is to provide a method capable of improving the beamform of an antenna by forming and controlling dual-beams having phases with each other.

The present disclosure provides a leaky wave antenna comprising a power supply line receiving power from the outside and a metal plate receiving a signal for forming a beam from the power supply line, in which etching patterns for forming a dual-beam are symmetrically formed on one side of the metal plate and the other side of the metal plate facing the one side and a plurality of vias are disposed between the one side and the other side.

According to an exemplary embodiment, in the etching pattern, a predetermined pattern in the form of a sine wave may be periodically formed along the one side of the metal plate.

According to an exemplary embodiment, the plurality of vias may be disposed along the one side of the metal plate in a line to be spaced apart from each other by predetermined intervals, and at least one of the plurality of vias may be electrically connected with a diode.

According to an exemplary embodiment, a plurality of via groups constituting the plurality of vias may be disposed along the one side of the metal plate in a line, and in each via group, a first via not electrically connected with the diode, a second via electrically connected with the diode, and a third via electrically connected with the diode may be sequentially disposed along the one side of the metal plate in a line.

According to an exemplary embodiment, when the at least one diode is turned on, the leaky wave antenna may form a first phase beam, and when the at least one diode is turned off, the leaky wave antenna may form a second phase beam.

According to an exemplary embodiment, the size of the etching pattern may decrease as a frequency band of the beam to be formed through the leaky wave antenna increases, and the number of the plurality of vias may increase as the frequency band of the beam to be formed through the leaky wave antenna increases.

The present disclosure provides an electronic device comprising a leaky wave antenna forming a dual-beam, in which the leaky wave antenna may comprise a power supply line receiving power from the outside; and a metal plate receiving a signal for forming a beam from the power supply line, in which etching patterns for forming a dual-beam are symmetrically formed between one side of the metal plate and the other side of the metal plate facing the one side and a plurality of vias are disposed between the one side and the other side.

According to an exemplary embodiment, in the etching pattern, a predetermined pattern in the form of a sine wave may be periodically formed along the one side of the metal plate.

According to an exemplary embodiment, the plurality of vias may be disposed along the one side of the metal plate in a line to be spaced apart from each other by predetermined intervals, and at least one of the plurality of vias may be electrically connected with a diode.

According to an exemplary embodiment, a plurality of via groups constituting the plurality of vias may be disposed along the one side of the metal plate in a line, and in each via group, a first via not electrically connected with the diode, a second via electrically connected with the diode, and a third via electrically connected with the diode may be sequentially disposed along the one side of the metal plate in a line.

According to an exemplary embodiment, when the at least one diode is turned on, the leaky wave antenna may form a first phase beam, and when the at least one diode is turned off, the leaky wave antenna may form a second phase beam.

According to an exemplary embodiment, the size of the etching pattern may decrease as a frequency band of the beam to be formed through the leaky wave antenna increases, and the number of the plurality of vias may increase as the frequency band of the beam to be formed through the leaky wave antenna increases.

According to an exemplary embodiment disclosed in the present disclosure, it is possible to extend an operating frequency band of an antenna without maximum gain drop through dual-beam formation. In addition, according to an exemplary embodiment disclosed in the present disclosure, it is possible to select a beam of a frequency band to be radiated through control of a diode constituting the antenna, and improve the accuracy of the antenna through an etching pattern having a specific shape.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure may be variously modified and have various exemplary embodiments and specific exemplary embodiments will be described in detail with reference to drawings. However, this does not limit the present disclosure to specific exemplary embodiments, and it should be understood that the present disclosure covers all the modifications, equivalents and replacements included within the idea and technical scope of the present disclosure. In describing each drawing, like reference numerals refer to like elements.

Terms including as first, second, A, B, and the like may be used for describing various components, but the components are not limited by the terms. The terms are used only to discriminate one component from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

It should be understood that, when it is described that a component is "connected to" or "accesses" the other component, the component may be directly connected to or access the other component, but another component may be present therebetween. In contrast, it should be understood that, when it is described that a component is "directly connected to" or "directly accesses" the other component, it will be understood that no component is present between the component and the other component.

Terms used in the present application are used only to describe specific exemplary embodiments, and are not intended to limit the present disclosure. A singular form may include a plural form unless otherwise clearly meant in the context. In the present application, it should be understood that the term "comprising" or "having" indicates that a feature, a number, a step, an operation, a component, a part or a combination thereof described in the specification is present, but does not exclude a possibility of presence or addition of one or more other features, numbers, steps, operations, components, parts or combinations thereof, in advance.

Unless contrarily defined, all terms used herein including technological or scientific terms have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

Throughout the specification and claims, unless explicitly described to the contrary, when any part "comprises" any component, it will be understood to further comprise another component without excluding any other component.

Hereinafter, preferred exemplary embodiments of the present disclosure will be described in detail with reference to the accompanying drawings.

Figure 1A:
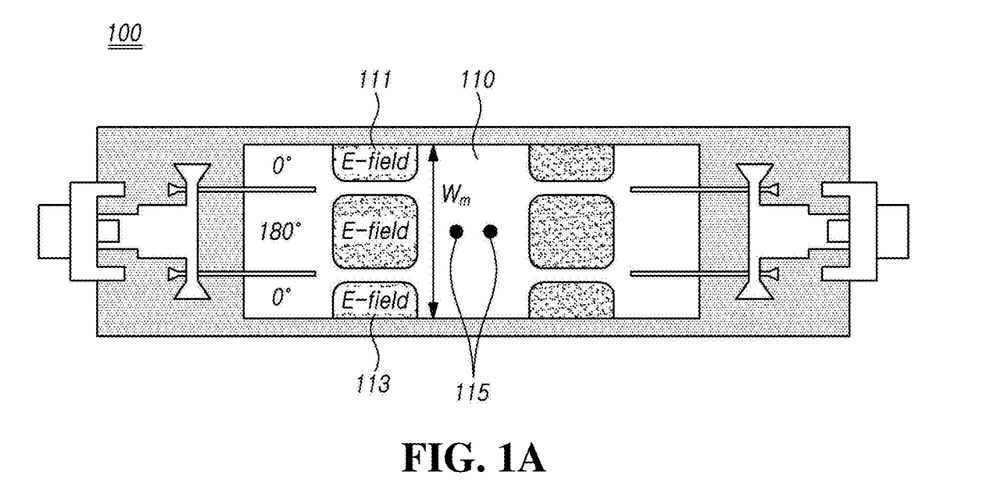
FIG. 1A is a diagram illustrating a leaky wave antenna structure according to a first exemplary embodiment of the present disclosure.

FIG. 1A is a diagram illustrating a leaky wave antenna structure according to a first exemplary embodiment of the present disclosure.

According to an exemplary embodiment, a leaky wave antenna 100 may include a metal plate 110 that receives a signal for forming a beam from a power supply line. According to various exemplary embodiments, the metal plate 110 may be made of copper.

According to an exemplary embodiment, etching patterns for forming the dual-beam may be symmetrically formed between one side 111 of the metal plate 110 and the other side 113 of the metal plate 110 facing the one side 111. According to various exemplary embodiments, a plurality of vias 115 may be disposed between the one side 111 and the other side 113.

According to an exemplary embodiment, a beam of a first frequency band may be formed through a first etching pattern formed on the one side 111, and a beam of a second frequency band may be formed through a second etching pattern formed on the other side 113. That is, the etching patterns are formed on both sides of the metal plate 110, so that the leaky wave antenna including the metal plate 110 may form a dual-beam.

Figure 1B:
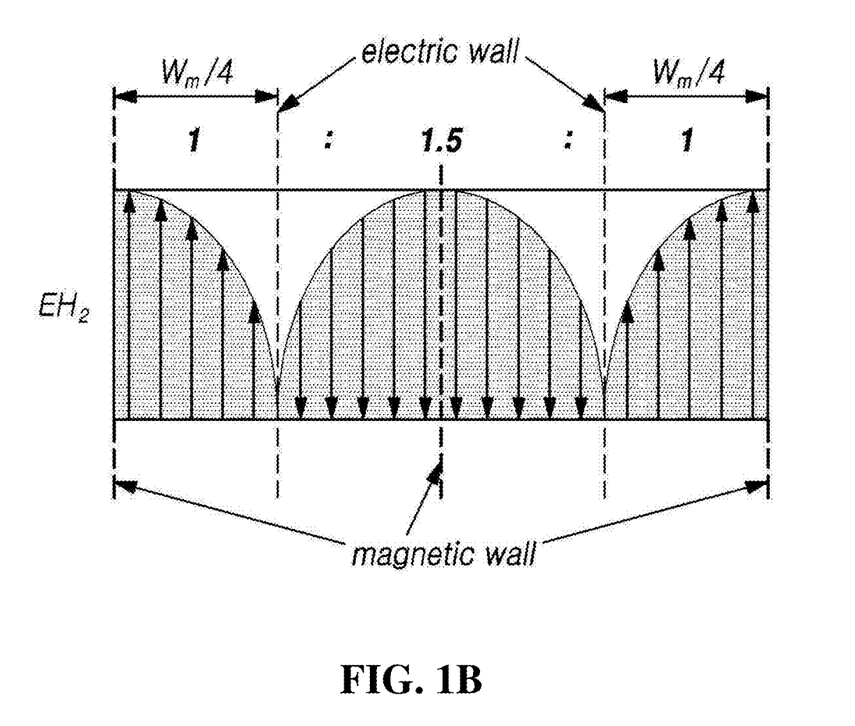
FIG. 1B is a diagram illustrating a phase distribution of a leaky wave antenna in a second mode ($EH_2$) according to the first exemplary embodiment of the present disclosure.

FIG. 1B is a diagram illustrating a phase distribution of a leaky wave antenna in a second mode ($EH_2$) according to the first exemplary embodiment of the present disclosure.

According to an exemplary embodiment, in the leaky wave antenna structure illustrated in FIG. 1A, in a first mode ($EH_1$, which may be a weakly attenuated mode), a central symmetric electric wall may have an electrical zero point. According to various exemplary embodiments, as illustrated in the phase distribution of FIG. 1B, in a second mode ($EH_2$, that is, may be a strong attenuation mode), three magnetic walls (one at the center and two at the edges) may be formed, and two electrical walls with phase inversion at the edges may be disposed.

According to an exemplary embodiment, in the second mode, since there are two current nulls on the edge at about ¼ of a width, two ground slots are disposed on the leaky wave antenna to form an electric field having the same size on both sides of the slot and a phase difference of 180°.

Figure 1C:
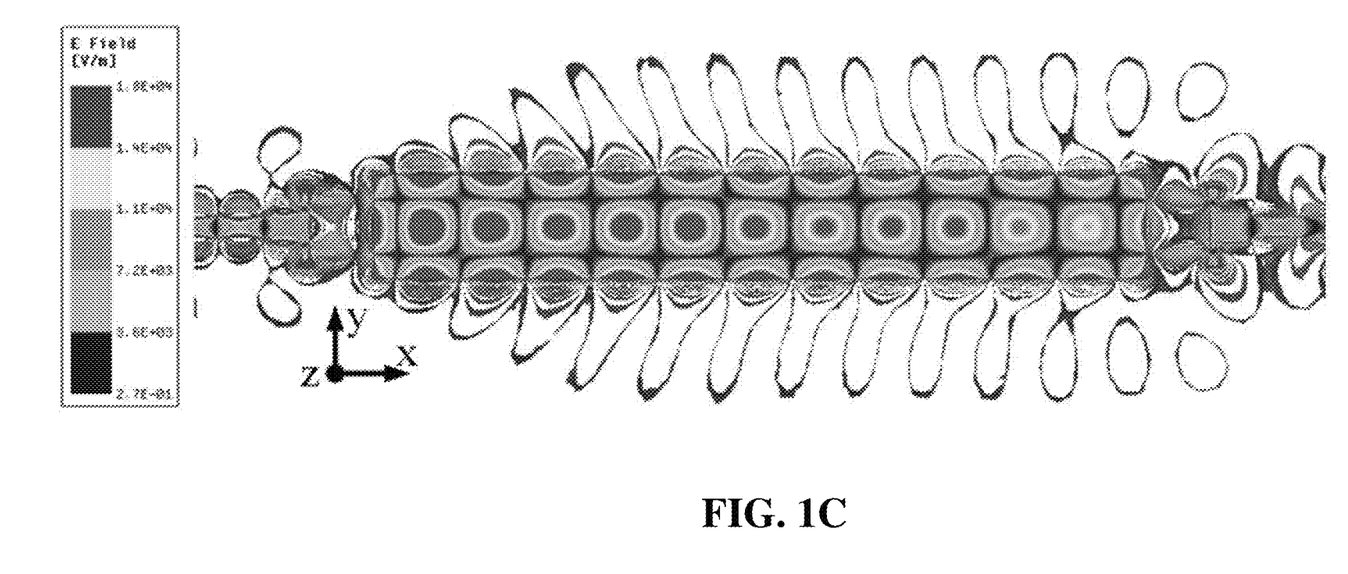
FIG. 1C is a graph showing an electric field distribution in the leaky wave antenna structure according to the first exemplary embodiment of the present disclosure.

FIG. 1C is a graph showing an electric field distribution in the leaky wave antenna structure according to the first exemplary embodiment of the present disclosure. It can be seen through the graph of FIG. 1C that electric fields are formed on both sides of the metal plate, and it can be seen that the leaky wave antenna may form a dual-beam.

Figure 2A:
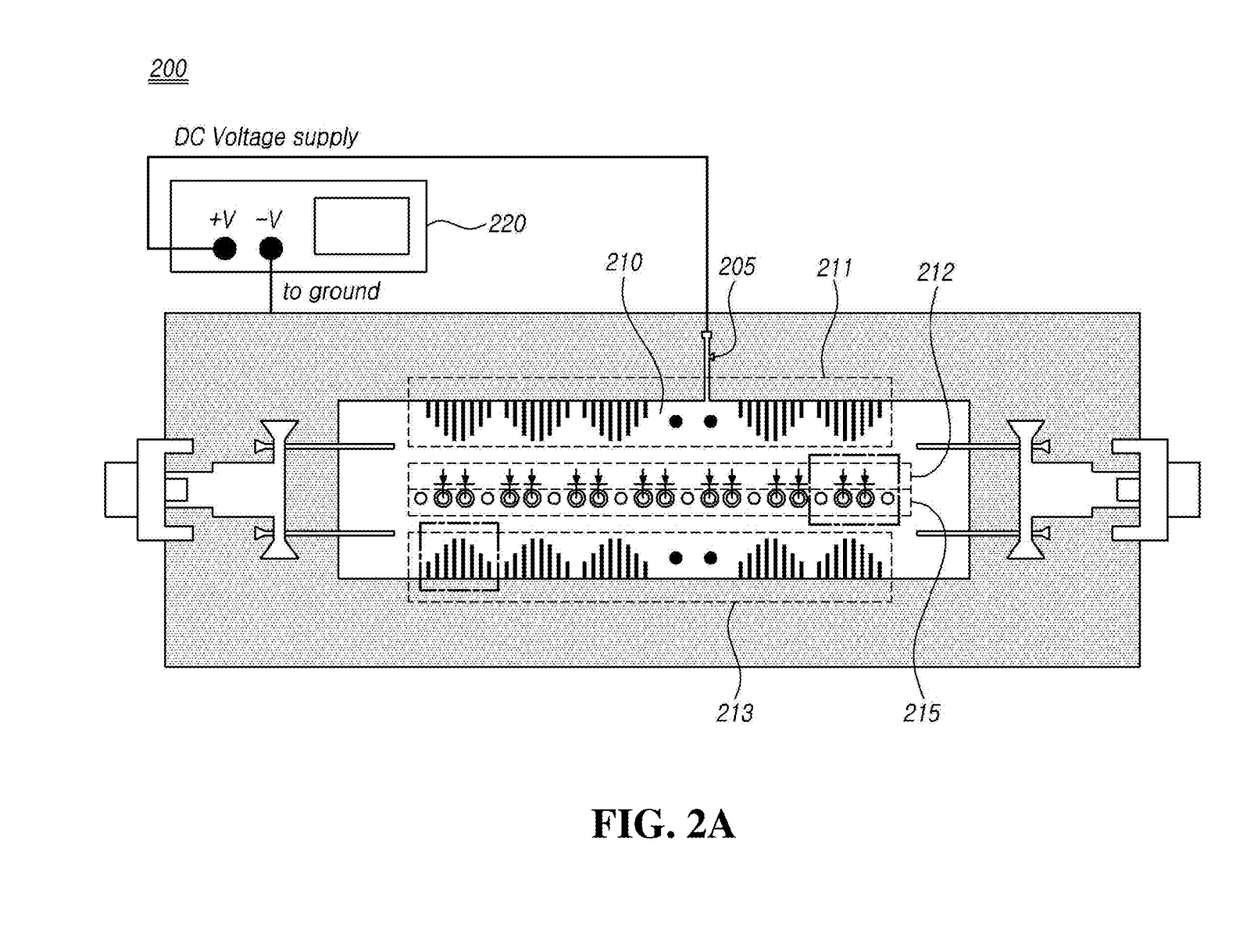
FIG. 2A is a diagram illustrating a leaky wave antenna structure according to a second exemplary embodiment of the present disclosure.

FIG. 2A is a diagram illustrating a leaky wave antenna structure according to a second exemplary embodiment of the present disclosure.

According to an exemplary embodiment, a leaky wave antenna 200 may comprise a power supply line 205 receiving power from the outside 220 and a metal plate 210 receiving a signal for forming a beam from the power supply line 205. According to various exemplary embodiments, the metal plate 210 may be made of copper.

According to an exemplary embodiment, etching patterns for forming the dual-beam may be symmetrically formed between one side 211 of the metal plate 210 and the other side 213 of the metal plate 210 facing the one side 211. According to various exemplary embodiments, a plurality of vias 215 may be disposed between the one side 211 and the other side 213.

According to an exemplary embodiment, in the etching pattern, a predetermined pattern in the form of a sine wave may be periodically formed along the one side 211 of the metal plate 210 and the other side 213 of the metal plate 210. According to various exemplary embodiments, a dual-beam may be formed through the etching patterns formed on the one side 211 and the other side 213.

According to an exemplary embodiment, as the frequency band of the beam to be formed through the leaky wave antenna 200 is increased, the size of the etching pattern may be decreased. That is, when a beam of a high frequency band is to be formed, an area to be etched in the metal plate 210 may be narrowed. According to various exemplary embodiments, etching patterns having the same shape may be symmetrically formed on the one side 211 and the other side 213 of the metal plate 210. A specific shape of the etching pattern formed on the metal plate 210 will be described below with reference to FIG. 2C.

According to an exemplary embodiment, the plurality of vias 215 constituting the leaky wave antenna 200 may be disposed in a line to be spaced apart from each other at predetermined intervals along the one side 211 of the metal plate 210. According to various exemplary embodiments, at least one of the plurality of vias 215 may be electrically connected to a diode 212.

According to an exemplary embodiment, the at least one diode 212 may be electrically connected to the plurality of vias 215 with a specific rule. For example, the diode is not electrically connected to a first via (which may be a via disposed at one end of the metal plate), and the diode may be electrically connect to a second via (which may be a via disposed second from one end of the metal plate) and a third via (which may be a via disposed third from one end of the metal plate). According to various exemplary embodiments, one via group including one via not connected to the above-described diode and two vias connected to the diode may be periodically repeated to constitute a plurality of vias 215.

On the other hand, since a connection relationship between the via and the diode mentioned in the present disclosure is only an exemplary embodiment of the present disclosure, the scope of the present disclosure should not be limited thereto. For example, the leaky wave antenna may have a via structure in which a via group including two vias not connected to a diode and three vias connected to the diode is periodically repeated. A specific shape of the connection relationship between the via and the diode will be described below with reference to FIG. 2B.

According to an exemplary embodiment, a phase of the beam radiated through the leaky wave antenna may be determined by controlling the operation of turning on and off of at least one diode 212 electrically connected to the plurality of vias 215. For example, when the at least one diode 212 is turned on, the leaky wave antenna 200 may form a first phase beam, and when the at least one diode 212 is turned off, the leaky wave antenna 200 may form a second phase beam. That is, the leaky wave antenna may form a dual-beam, and may select and radiate a beam having a desired phase of the dual-beam through diode control. According to various exemplary embodiments, the number of the plurality of vias 215 constituting the leaky wave antenna 200 may increase as the frequency band of a beam to be formed through the leaky wave antenna 200 increases.

Figure 2B:
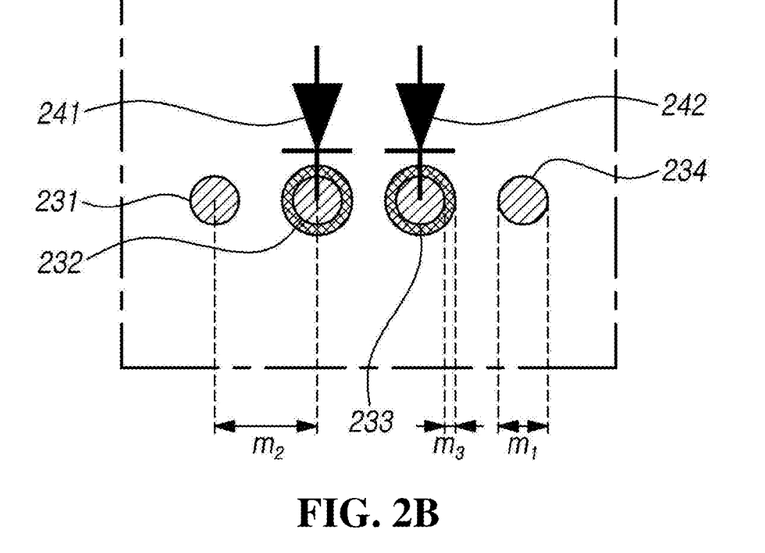
FIG. 2B is a diagram enlarging a plurality of vias in the leaky wave antenna structure according to the second exemplary embodiment of the present disclosure.

FIG. 2B is a diagram enlarging a plurality of vias in the leaky wave antenna structure according to the second exemplary embodiment of the present disclosure.

According to an exemplary embodiment, a plurality of vias and a plurality of diodes may be formed by periodically arranging a group including the plurality of diodes and the plurality of vias. According to various exemplary embodiments, a first via 231 not connected to the diode, a second via 232 connected to the first diode 241, and a third via 233 connected to a second diode 242 may form a first group. According to various exemplary embodiments, a second group having the same shape as the first group may be disposed in the leaky wave antenna in succession to the first group. For example, a fourth via 234 not connected to the diode in the second group may be disposed after the third via 233 connected to the second diode 242.

According to an exemplary embodiment, a diameter of each via 231, 232, 233, or 234 may be 0.2 mm, a distance between the centers of each via may be 1.64 mm, and a distance between the via and a slot formed with the via may be 0.1 mm. On the other hand, since the via size and distance illustrated in FIG. 2B are only an exemplary embodiment of the present disclosure, the scope of the present disclosure should not be limited thereto.

Figure 2C:
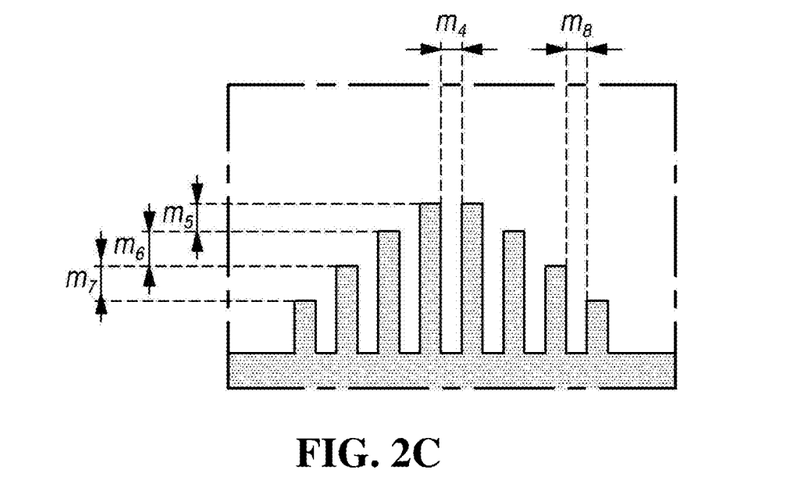
FIG. 2C is a diagram enlarging an etching pattern in the leaky wave antenna structure according to the second exemplary embodiment of the present disclosure.

FIG. 2C is a diagram enlarging an etching pattern in the leaky wave antenna structure according to the second exemplary embodiment of the present disclosure.

According to an exemplary embodiment, the etching pattern formed on the leaky wave antenna may have a sine wave shape. More specifically, etching in a rectangular shape having different heights may be periodically disposed in a sine wave shape as illustrated in FIG. 2C. According to various exemplary embodiments, a width of each rectangular etching pattern constituting the etching pattern may be 0.14 mm, and a difference in height between an etching pattern having the highest height and an etching pattern having the second highest height may be 0.22 mm. In addition, a difference in height between the etching pattern having the second highest height and an etching pattern having the third highest height may be 0.15 mm, a difference in height between the etching pattern having the third highest height and an etching pattern having the lowest height may be 0.22 mm, and a distance between the rectangular etching patterns may be 0.12 mm. On the other hand, since the size and distance of the etching pattern illustrated in FIG. 2C are only an exemplary embodiment of the present disclosure, the scope of the present disclosure should not be limited thereto.

Figure 3:
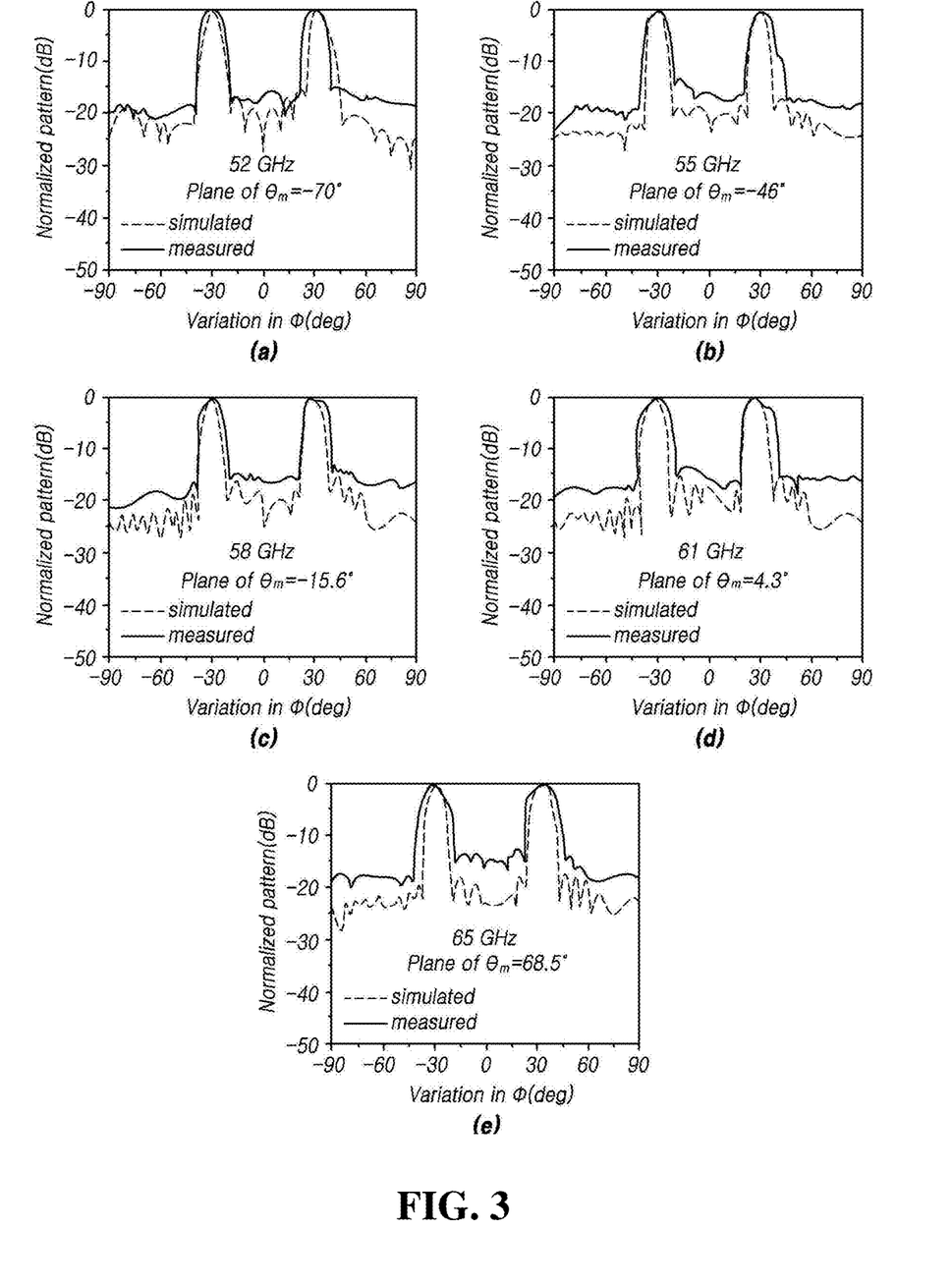
FIG. 3 is a diagram for describing a dual-beam formed by a leaky wave antenna according to an exemplary embodiment of the present disclosure.

FIG. 3 is a diagram for describing a dual-beam formed by a leaky wave antenna according to an exemplary embodiment of the present disclosure. According to the graph shown in FIG. 3, it can be seen that the leaky wave antenna according to the present disclosure may generate a beam having a phase of −30° and a phase of +30°. That is, the leaky wave antenna according to the present disclosure may form a dual-beam. In addition, it can be seen through the graph of FIG. 3 that the leaky wave antenna structure disclosed in the present disclosure is operable in an ultra-high frequency band of 50 GHz or more.

The above description just illustrates the technical spirit of the present disclosure and various changes and modifications can be made by those skilled in the art to which the present disclosure pertains without departing from an essential characteristic of the present disclosure. Therefore, the various exemplary embodiments disclosed in the present disclosure are not intended to limit the technical spirit but describe the present disclosure and the technical spirit of the present disclosure is not limited by the following exemplary embodiments. The protective scope of the present disclosure should be construed based on the appended claims, and all the technical spirits in the equivalent scope thereto should be construed as falling within the scope of the present disclosure.

What is claimed is:

1. A leaky wave antenna forming a dual-beam, comprising:
a power supply line configured to receive power from outside;
a metal plate configured to receive a signal for forming a beam from the power supply line,
wherein etching patterns for forming a dual-beam are symmetrically formed between one side of the metal plate and the other side of the metal plate facing the one side and a plurality of vias are disposed between the one side and the other side.

2. The leaky wave antenna of claim 1, wherein in the etching pattern, a predetermined pattern in a form of a sine wave is periodically formed along the one side of the metal plate.

3. The leaky wave antenna of claim 1, wherein the plurality of vias are disposed along the one side of the metal plate in a line to be spaced apart from each other by predetermined intervals, and at least one of the plurality of vias is electrically connected with a diode.

4. The leaky wave antenna of claim 3, wherein a plurality of via groups constituting the plurality of vias are disposed along the one side of the metal plate in a line, and in each via group, a first via not electrically connected with the diode, a second via electrically connected with the diode, and a third via electrically connected with the diode are sequentially disposed along the one side of the metal plate in a line.

5. The leaky wave antenna of claim 3, wherein when the at least one diode is turned on, the leaky wave antenna forms a first phase beam, and when the at least one diode is turned off, the leaky wave antenna forms a second phase beam.

6. The leaky wave antenna of claim 3, wherein a size of the etching pattern decreases as a frequency band of the beam to be formed through the leaky wave antenna increases, and the number of the plurality of vias increases as the frequency band of the beam to be formed through the leaky wave antenna increases.

7. An electronic device comprising a leaky wave antenna forming a dual-beam, wherein the leaky wave antenna comprises
a power supply line configured to receive power from outside; and
a metal plate configured to receive a signal for forming a beam from the power supply line,
wherein etching patterns for forming a dual-beam are symmetrically formed between one side of the metal plate and the other side of the metal plate facing the one side and a plurality of vias are disposed between the one side and the other side.

8. The electronic device of claim 7, wherein in the etching pattern, a predetermined pattern in a form of a sine wave is periodically formed along the one side of the metal plate.

9. The electronic device of claim 7, wherein the plurality of vias are disposed along the one side of the metal plate in a line to be spaced apart from each other by predetermined intervals, and at least one of the plurality of vias is electrically connected with a diode.

10. The electronic device of claim 9, wherein a plurality of via groups constituting the plurality of vias are disposed along the one side of the metal plate in a line, and in each via group, a first via not electrically connected with the diode, a second via electrically connected with the diode, and a third via electrically connected with the diode are sequentially disposed along the one side of the metal plate in a line.

11. The electronic device of claim 9, wherein when the at least one diode is turned on, the leaky wave antenna forms a first phase beam, and when the at least one diode is turned off, the leaky wave antenna forms a second phase beam.

12. The electronic device of claim 9, wherein a size of the etching pattern decreases as a frequency band of the beam to be formed through the leaky wave antenna increases, and the number of the plurality of vias increases as the frequency band of the beam to be formed through the leaky wave antenna increases.

* * * * *